(12) United States Patent
Goyal et al.

(10) Patent No.: US 10,049,106 B2
(45) Date of Patent: Aug. 14, 2018

(54) NATURAL LANGUAGE GENERATION THROUGH CHARACTER-BASED RECURRENT NEURAL NETWORKS WITH FINITE-STATE PRIOR KNOWLEDGE

(71) Applicant: Xerox Corporation, Norwalk, CT (US)

(72) Inventors: Raghav Goyal, Berlin (DE); Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/408,526

(22) Filed: Jan. 18, 2017

(65) Prior Publication Data

US 2018/0203852 A1 Jul. 19, 2018

(51) Int. Cl.
  *G06F 17/27* (2006.01)
  *G06F 17/28* (2006.01)
  *G10L 25/30* (2013.01)

(52) U.S. Cl.
  CPC ........ *G06F 17/2881* (2013.01); *G06F 17/279* (2013.01); *G10L 25/30* (2013.01)

(58) Field of Classification Search
  CPC ..... G06F 17/2881; G06F 17/297; G10L 25/30
  USPC .......................................................... 704/9
  See application file for complete search history.

(56) References Cited

U.S. PATENT DOCUMENTS

| | | | | |
|---|---|---|---|---|
| 5,584,024 | A * | 12/1996 | Shwartz | G06F 17/30392 |
| 6,169,981 | B1 * | 1/2001 | Werbos | G05B 13/0265 |
| | | | | 706/15 |
| 8,775,341 | B1 * | 7/2014 | Commons | G06N 3/0454 |
| | | | | 706/20 |
| 9,595,002 | B2 * | 3/2017 | Leeman-Munk | G06N 3/0445 |
| 9,842,105 | B2 * | 12/2017 | Bellegarda | G06F 17/2785 |
| 2017/0148433 | A1 * | 5/2017 | Catanzaro | G10L 15/02 |
| 2017/0270919 | A1 * | 9/2017 | Parthasarathi | G10L 15/20 |
| 2017/0301347 | A1 * | 10/2017 | Fuhrman | G10L 15/20 |
| 2017/0316775 | A1 * | 11/2017 | Le | G10L 15/16 |
| 2017/0337478 | A1 * | 11/2017 | Sarikaya | G06F 3/167 |

OTHER PUBLICATIONS

U.S. Appl. No. 15/209,135, filed Jul. 13, 2016, Chunyang Xiao, et al.
U.S. Appl. No. 14/811,005, filed Jul. 28, 2015, Dymetman, et al.
(Continued)

*Primary Examiner* — Jakieda Jackson
(74) *Attorney, Agent, or Firm* — Fay Sharpe LLP

(57) ABSTRACT

A method and a system for generating a target character sequence from a semantic representation including a sequence of characters are provided. The method includes adapting a target background model, built from a vocabulary of words, to form an adapted background model. The adapted background model accepts subsequences of an input semantic representation as well as words from the vocabulary. The input semantic representation is represented as a sequence of character embeddings, which are input to an encoder. The encoder encodes each of the character embeddings to generate a respective character representation. A decoder then generates a target sequence of characters, based on the set of character representations. At a plurality of time steps, a next character in the target sequence is selected as a function of a previously generated character(s) of the target sequence and the adapted background model.

20 Claims, 8 Drawing Sheets

(56) References Cited

OTHER PUBLICATIONS

U.S. Appl. No. 14/810,817, filed Jul. 28, 2015, Venkatapathy, et al.
U.S. Appl. No. 15/147,222, filed May 5, 2016, Xiao, et al.
U.S. Appl. No. 15/209,135, filed Jul. 13, 2016, Xiao, et al.
Allauzen, et al., "OpenFst: A general and efficient weighted finite-state transducer library," Int'l Conf. on Implementation and Application of Automata, pp. 11-23 (2007).
Al-Rfou, et al., "Theano: A Python framework for fast computation of mathematical expressions," arXiv 1605.02688, pp. 1-19 (2016).
Bahdanau, et al., "Neural machine translation by jointly learning to align and translate," arXiv:1409.0473, pp. 1-15 (2014).
Bastien, et al., "Theano: new features and speed improvements," arXiv:1211.5590, pp. 1-10 (2012).
Belz, "Automatic Generation of Weather Forecast Texts Using Comprehensive Probabilistic Generation-Space Models," Natural Language Engineering, vol. 14(04), pp. 431-455 (2008).
Bengio, et al., "Learning long-term dependencies with gradient descent is difficult," IEEE Trans. on Neural Networks, vol. 5(2), pp. 157-166 (1994).
Cho, et al., "Learning phrase representations using RNN encoder-decoder for statistical machine translation," arXiv:1406.1078, pp. 1-15 (2014).
Dieleman, et al., (2015). Lasagne: First release, pp. 1-2 (2015), downloaded at https://zenodo.org/record/27878#.WBumnmorKUk.
Dymetman, et al., Log-Linear RNNs: Towards Recurrent Neural Networks with Flexible Prior Knowledge, arXiv: 1607.02467, pp. 1-22 (2016).
Gers, et al., "Learning to forget: Continual prediction with LSTM," Neural computation, vol. 12(10), pp. 2451-2471(2000).
Goyal, et al, "Natural Language Generation through character-based RNNs with finite state knowledge," Proceedings of COLING 2016, Technical Papers, pp. 1083-1092, Dec. 2016.
Graves, et al., "Speech recognition with deep recurrent neural networks," 2013 IEEE Int'l Conf. on Acoustics, Speech and Signal Processing (ICASSP), pp. 6645-6649 (2013).
Hecht-Nielsen, "Theory of the backpropagation neural network," Int'l Joint Conf. on Neural Networks (IJCNN), pp. 593-605 (1989).
Hochreiter, et al., "Long short-term memory," Neural computation, vol. 9(8), pp. 1735-1780 (1997).
Kingma, et al., "Adam: A method for stochastic optimization," Proc. 3rd Int'l Conf. on Learning Representations (ICLR), pp. 1-15 (2014).
Koehn, "Statistical significance tests for machine translation evaluation," EMNLP, pp. 388-395 (2004).
Langkilde, et al., "Generation that exploits corpus-based statistical knowledge," Proc. 36th Annual Meeting of the ACL and 17th Int'l Conf. on Computational Linguistics—vol. 1, ACL '98, pp. 704-710 (1998).
Ling, et al., "Latent Predictor Networks for Code Generation," arXiv:1603.06744v2, pp. 1-13 (2016).
Ling, et al., "Character-based Neural Machine Translation," arXiv:1511.04586, pp. 1-11 (2015).
Luong, et al., "Achieving Open Vocabulary Neural Machine Translation with Hybrid Word-Character Models," arXiv:1604.00788, pp. 1-11 (2016).
Luong, et al., "Addressing the Rare Word Problem in Neural Machine Translation," Arxiv:1410.8206, pp. 1-11 (2014).
Papineni, et al., "BLEU: a method for automatic evaluation of machine translation," Proc. 40th ACL annual meeting, pp. 311-318 (2002).
Reiter, et al., "Building Natural Language Generation Systems," Cambridge University Press, pp. 1-15 (2000).
Sutskever, et al., "Sequence to sequence learning with neural networks," Advances in neural information processing systems (NIPS), pp. 3104-3112 (2014).
Tai, et al., "Improved semantic representations from tree-structured long short-term memory networks," Proc. 53rd Annual Meeting of the ACL and the 7th Int'l Joint Conf. on Natural Language Processing, pp. 1556-1566 (2015).
Vinyals, et al., "Pointer Networks," Adv. in Neural Information Processing Systems (NIPS), pp. 2692-2700 (2015).
Vinyals, et al., "A neural conversational model," arXiv:1506.05869, pp. 1-8 (2015).
Wen, et al., "Semantically conditioned lstm-based natural language generation for spoken dialogue systems," arXiv:1508.01745, pp. 1-11 (2015).
Werbos, "Backpropagation through time: what it does and how to do it," Proc. IEEE, vol. 78(10), pp. 1550-1560 (1990).
Xiao, et al., "Sequence-based structured prediction for semantic parsing," Proc. Association for Computational Linguistics, pp. 1341-1350 (2016).

* cited by examiner

NATURAL LANGUAGE GENERATION THROUGH CHARACTER-BASED RECURRENT NEURAL NETWORKS WITH FINITE-STATE PRIOR KNOWLEDGE

BACKGROUND

The exemplary embodiment relates to natural language generation and finds particular application in connection with a system and method for generating natural language from a dialog act generated by an automated spoken dialog system.

Natural Language Generation (NLG) is an important component of most Spoken Dialog Systems. Given a dialog act, which is a semantic representation of a piece of dialog to be generated, the aim is to convert the dialog act into natural language form. Dialog systems are most useful when the natural language utterance generated is adequate, fluent and also has human-like naturalness. However, using an automated NLG component to generate well-formed speech can be challenging. For example, a dialog system could generate a dialog act such as: inform(name='hotel lakeside'; phone='9134623000';postcode='64158'). Given such a dialog act, a human could generate: "The phone number of the hotel lakeside is 9134623000 and its postcode is 64158." However, the dialog system may generate an incorrect or poorly worded output, such as: "hotel hotel lakeside is at phone 9134623000 at postcode 64158."

Rule-based generators have been successful in some applications, but suffer from the problem of fixed, repetitive utterances, which are undesirable in NLG systems.

Recently, Neural Network (NN)-based approaches to Natural Language Processing (NLP) have been developed for applications in machine translation (Sutskever, et al., "Sequence to sequence learning with neural networks," Advances in neural information processing systems (NIPS), pp. 3104-3112 (2014), hereinafter, "Sutskever 2014"), conversation modeling (Vinyals, et al., "A neural conversational model," arXiv:1506.05869, pp. 1-8 (2015)), and sentiment classification and parsing (Tai, et al., "Improved semantic representations from tree-structured long short-term memory networks," Proc. 53rd Annual Meeting of the ACL and the 7th Int'l Joint Conf. on Natural Language Processing, pp. 1556-1566 (2015)).

In particular, Recurrent Neural Network (RNN) based architectures, such as Long Short-Term Memory (LSTM) and Gated Recurrent Unit (GRU) RNNs, are often used in language modeling tasks due to their ability to model sequential information with long range dependencies (Hochreiter, et al., "Long short-term memory," Neural computation, 9(8):1735-1780 (1997), hereinafter, "Hochreiter 1997"; Cho, al., "Learning phrase representations using RNN encoder-decoder for statistical machine translation," arXiv:1406.1078, pp. 1-15 (2014), hereinafter, Cho 2014).

A RNN-based Natural Language Generation approach for spoken dialog systems has been proposed by Wen, et al., "Semantically conditioned LSTM-based natural language generation for spoken dialogue systems," arXiv: 1508.01745, pp. 1-11 (2015), hereinafter, "Wen 2015." In this approach, a standard LSTM cell is augmented to process the input dialog in an unaligned manner to generate a corresponding utterance. A word-based generator uses words as the smallest token. However, this word-based model relies on pre-processing the original data where the named entities are substituted with placeholders, a process known as de-lexicalization. This is necessary because the word-level RNN is not able to "copy" the source words into the target, but has to learn a correspondence, which it can only do with a large amount of data.

Such an approach has drawbacks in considering morphological variance associated with a language, where essential information is lost during the de-lexicalization process. For example, languages whose verb forms depend on the gender-specific information present in the named entities cannot be generated correctly. Also, this approach suffers from coordination issues when multiple occurrences of the same type of information exist in the dialog act. For example, if the aim is to convey that two different hotels accept credit cards, the model has to de-lexicalize the names of the hotels using sub-categories such as: "NAME-1" and "NAME-2." The model would therefore need to include categories within a placeholder to learn the interaction between them. Unknown words also pose problems.

There remains a need for a natural language generation method which addresses these problems.

INCORPORATION BY REFERENCE

The following references, the disclosures of which are incorporated herein by reference in their entireties, are mentioned:

U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al.

U.S. application Ser. No. 14/810,817 filed Jul. 28, 2015, entitled LEARNING GENERATION TEMPLATES FROM DIALOG TRANSCRIPTS, by Sriram Venkatapathy, et al.

U.S. application Ser. No. 15/147,222, filed May 5, 2016, entitled SEMANTIC PARSING USING DEEP NEURAL NETWORKS FOR PREDICTING CANONICAL FORMS, by Chunyang Xiao, et al.

U.S. application Ser. No. 15/209,135, filed Jul. 13, 2016, entitled SEQUENCED-BASED STRUCTURED PREDICTION FOR SEMANTIC PARSING, by Chunyang Xiao, et al.

BRIEF DESCRIPTION

In accordance with one aspect of the exemplary embodiment, a method for generation of a target sequence from a semantic representation. The method includes adapting a target background model, built from a vocabulary of words, to form an adapted background model, which accepts subsequences of an input semantic representation, the input semantic representation including a sequence of characters. The input semantic representation is represented as a sequence of character embeddings. The character embeddings are encoded, with an encoder, to generate a set of character representations. With a decoder, a target sequence of characters is generated, based on the set of character representations. This includes, at a plurality of time steps, generating a next character in the target sequence as a function of a previously generated character of the target sequence and the adapted background model.

At least one of the representing of the input semantic representation, adapting of the background model, encoding the character embeddings, and generating a target sequence of characters may be performed with a processor.

In accordance with another aspect of the exemplary embodiment, a system for generation of a target sequence from a semantic representation which includes a sequence of characters is provided. The system includes a hierarchical character sequence-to-character sequence model. A character embedding component represents an input semantic representation as a sequence of character embeddings. A natural language generation component inputs the sequence of character embeddings into the hierarchical model. A processor implements the character embedding component and the natural language generation component. The hierarchical model includes a target background model, an encoder, and a decoder. The target background model has been built from a vocabulary of words and is adapted to form an adapted background model, which accepts subsequences of the input semantic representation. The encoder encodes the character embeddings to generate a set of character representations. The decoder generates a target sequence of characters, based on the set of character representations, including, at a plurality of time steps, generating a next character in the target sequence as a function of a previously generated character of the target sequence, and the adapted background model.

In accordance with one aspect of the exemplary embodiment, a method is provided for generating a system for generation of a target sequence of characters from an input semantic representation. The method includes providing training data which includes training pairs, each training pair including a semantic representation and a corresponding reference sequence in a natural language. A target background model is built using words occurring in the training data, the target background model being adaptable to accept subsequences of an input semantic representation. The target background model is incorporated into a hierarchical model which includes an encoder and a decoder, the encoder and decoder each operating at the character level. The background model, when adapted to accept subsequences of an input semantic representation, biases the decoder towards outputting a target character sequence including at least one of: words occurring in the training data, and subsequences of the input semantic representation. The hierarchical model is trained on the training pairs to output a target sequence from an input semantic representation.

At least one of the building of the target background model, incorporating the target background model, and training the hierarchical model may be performed with a processor.

DETAILED DESCRIPTION

A system and method for natural language generation are described in the context of a dialog system in which a virtual agent conducts a dialog with a human speaker. The exemplary system and method make use of a character-level language generation model, which unlike word-level models, does not require de-lexicalization. This architecture, coupled with an attention mechanism (e.g., Bahdanau, et al., "Neural machine translation by jointly learning to align and translate," arXiv:1409.0473, pp. 1-15 (2014), hereinafter, "Bahdanau 2014"), is able to "copy" information from a source dialog into a target dialog. In addition, a "background" model, in the form of a weighted finite state acceptor, is incorporated to inhibit the generation of non-words and false information made by the character-level model.

In the method, an input semantic representation (a dialog act), is considered as a string of characters from a finite alphabet, which is input to the attention-based character-to-character model. This avoids the need for de-lexicalizing some aspects of the input and permits copy mechanisms at the character level. For example, a string of numbers can be copied directly to the output. To improve the quality of the generated utterances, a priori knowledge in the form of a weighted finite-state automaton that constrains the generated strings of characters to either conform to a predefined vocabulary of words, or to originate in portions of the semantic input, is exploited. This automaton is integrated within the RNN through an adaptor-background mechanism.

Unlike a word-level model, the model described herein does not require de-lexicalization because it is able to learn correspondence between the source and target characters which form a small alphabet (e.g., about 50 symbols) which may each be observed many times. It is thus able to "copy" source characters into the target from the original unprocessed data. This copy mechanism is not present in usual word-based RNNs, which have to learn each mapping from scratch.

As used herein, a "character" is a single symbol in a predefined, finite alphabet of characters (e.g., all or a subset of the ASCII character set). No character in the alphabet includes more than one symbol. A "word" includes a set of characters drawn from the alphabet, and although some words may consist of a single character, at least some of the words in dialog act or a text sequence include at least two, or at least three, or at least four of the characters. As defined herein, "words" can include number sequences, punctuation, and the like, and need not be defined in a dictionary. A "text sequence" is a sequence of words and while some text sequences may consist of a single word, at least some text sequences include at least two, or at least three, or at least four words.

Figure 1:
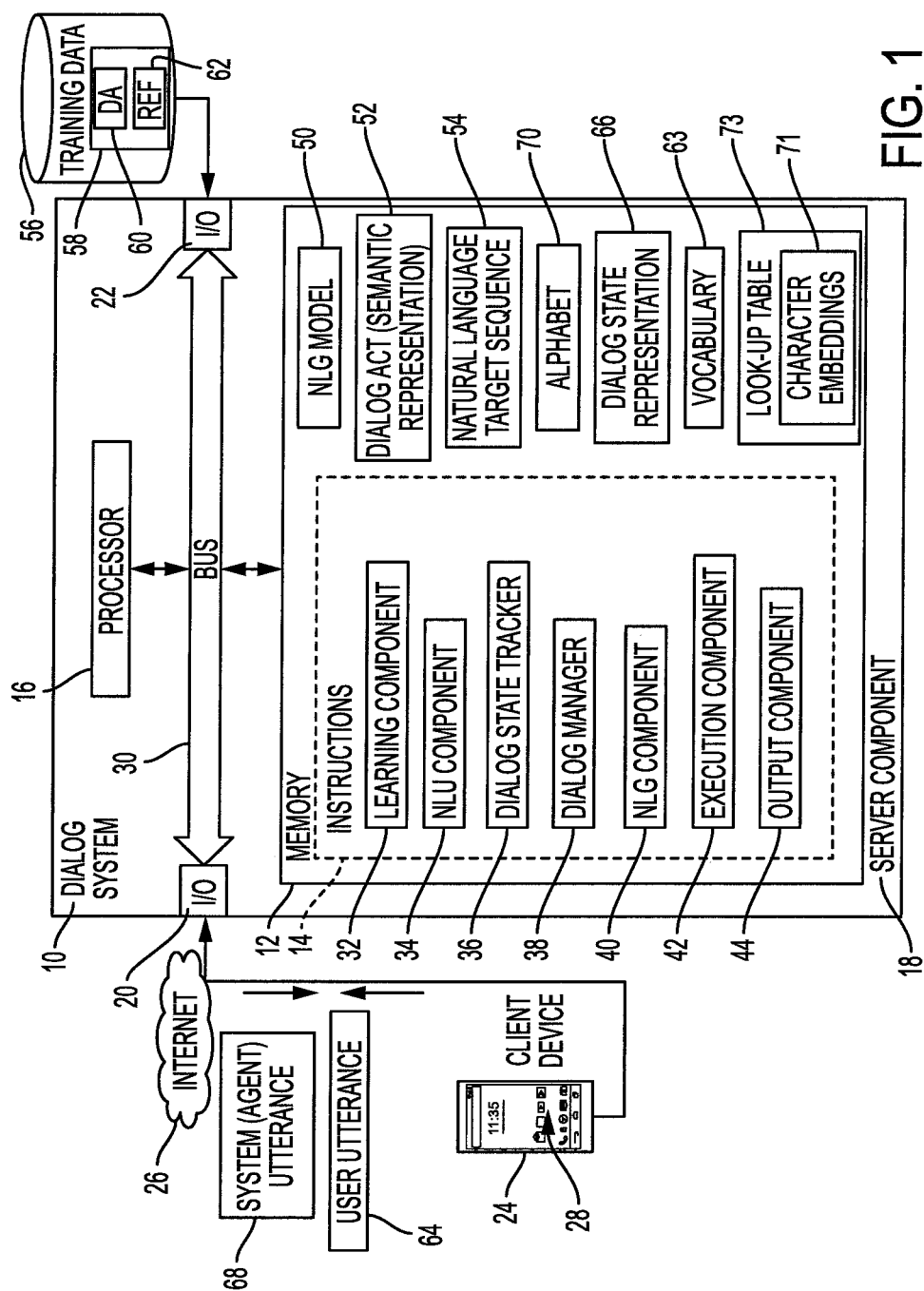
FIG. 1 is a functional block diagram of a system for natural language generation in the form of a dialog system, in accordance with one aspect of the exemplary embodiment.

With reference to FIG. 1, a dialog system 10 is shown. The dialog system is configured for conducting a dialog in a natural language, such as English or French, between a (virtual) agent and a user. The exemplary system sequentially updates its belief of the dialog state using information extracted from user (and agent) utterances, generates a semantic representation of a next utterance, and converts this to a natural language utterance. However, the system may perform fewer than all of these functions, such as simply generating a natural language utterance from a computer-generated semantic representation.

Figure 2:
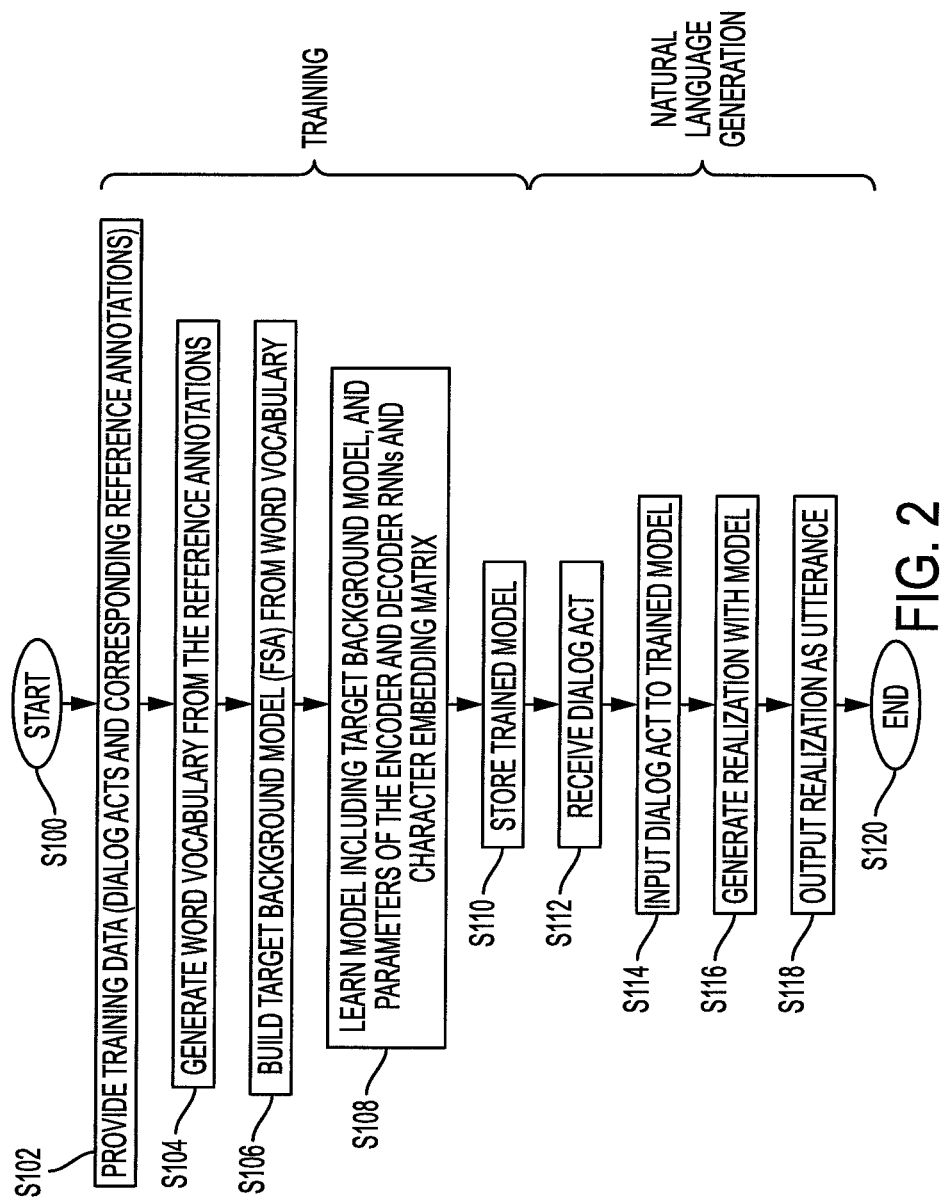
FIG. 2 is a flow chart illustrating a method of language generation in accordance with another aspect of the exemplary embodiment.

The dialog system 10 includes memory 12 which stores instructions 14 for performing the method illustrated in FIGS. 2 and/or 3 and a processor 16 in communication with the memory for executing the instructions. The system 10 may include one or more computing devices 18, such as the illustrated server computer. One or more input/output (I/O) devices 20, 22 allow the system to communicate with external devices, such as the illustrated client device 24, via wired or wireless connections 26, such as the Internet, telephone line, mobile communication network, or the like. In another embodiment, the system may be at least partially resident on the client device 24. The client device 24 may include an audible and or visual output device 28, such as a display screen and/or speaker(s). Hardware components 12, 16, 20, 22 of the system are communicatively connected by a data/control bus 30.

The illustrated instructions 14 include a learning component 32, a natural language understanding (NLU) component 34, a dialog state tracker 36, a dialog manager 38, a natural language generation (NLG) component 40, an execution component 42, and an output component 46, although some of these components may be omitted.

The learning component 32 learns a natural language generation model 50, in the form of a character sequence-to-character sequence model. The model 50 receives as input a semantic representation 52 of information to be conveyed in a natural language utterance, referred to herein as a dialog act, and outputs a target text sequence 54 in a natural language, such as English or French. The model 50 is trained on training data 56 which may include a collection of (dialog act, reference sequence) pairs 58. Each pair 58 includes a dialog act 60 and a corresponding reference sequence 62. Each dialog act 60 is a computer-generated representation that encodes respective information to be conveyed. Each reference sequence 62 is a text sequence, in a natural language, which has been generated by a human, and is therefore expected to be understandable by humans, i.e., is expected to be a well-formed and grammatical textual representation of the respective dialog act.

In generating the hierarchical model 50, a target vocabulary 63 of words is built from the reference sequences 62 in the collection 56 and may include all the words found in the reference sequences 62, or a subset of the most common ones (e.g., excluding named entities). A set of at least 100, such up to 10,000 or up to 1000 common words may be used. The vocabulary 63 is used to bias the model 50 towards outputting known words.

The NLU component 32 receives human-generated utterances 64 in the form of speech or text from the client device 24 and converts them to a form that can be processed by the dialog state tracker 36. In the case of spoken utterances, this may include speech-to-text conversion with an automated speech recognition (ASR) component.

The statistical dialog state tracker 36 serves to instantiate a set of variables over the course of a dialog. A dialog state representation 66 is stored as a representation of the predicted values of the variables, at a given time, over the course of the dialog. As an example, the user of the client device 24 may express an intent to book a hotel reservation and the statistical dialog state tracker progressively instantiates variables such as destination, dates, price range, etc., with their most likely values, based on the dialog.

The dialog manager 38 generates a dialog act 52, based on the current dialog state 66 predicted by the dialog state tracker 36. Some of the dialog acts may correspond to requests for information, others to confirmations, and others to information being provided, such as the name and location of an available hotel in the user's price range, in the hotel booking example.

The natural language generation (NLG) component 40, in the context of a dialog system, aims to generate a natural language utterance 54 from a given semantic representation 52. For example:

[D-ACT]: inform(name='hotel lakeside'; phone='9134623000';postcode='64158')
[REF]: the phone number for hotel lakeside is 9134623000. its postal code is 64158.

where [D-ACT] is the dialog act 52, which specifies the information to be conveyed and [REF] is the corresponding textual realization 62 of the dialog act, as it would be produced by a human.

The exemplary NLG component 40 receives the dialog act 52 and inputs it to the trained model 50, which outputs a textual realization as the target sequence 54.

The exemplary encoder-decoder RNN model 50 described herein is a type of sequence to sequence model (Seq-2-Seq). Such models have previously been used for machine translation, where the task is to translate a sentence from a source language to a target language, and developed by Sutskever 2014. It uses an RNN to encode a source sentence into some fixed vector representation which is later fed into another RNN to decode the target sentence.

The output component 44 outputs the target sequence 54 from the system to the client device 24 as an agent utterance 68. In some embodiments, the execution component 42 completes a transaction, such as booking the hotel, in the hotel booking example.

In the exemplary embodiment, each dialog act 52 is treated as a character sequence defined over a predefined alphabet 70, such as the set of characters observed in the training pairs 58. In general, the set of characters includes letters, numbers, punctuation and a space character, and may further include characters commonly used in the domain of interest. For example the alphabet may be a set of at least 30, or at least 40, or up to 400, or up to 300, or up to 200, or up to 100, or about 50 characters. Each character may be assigned a respective character embedding (a vectorial representation) 71.

The computer-implemented system 10 may include one or more computing devices 18, such as a desktop, laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface 20, 22 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 18.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
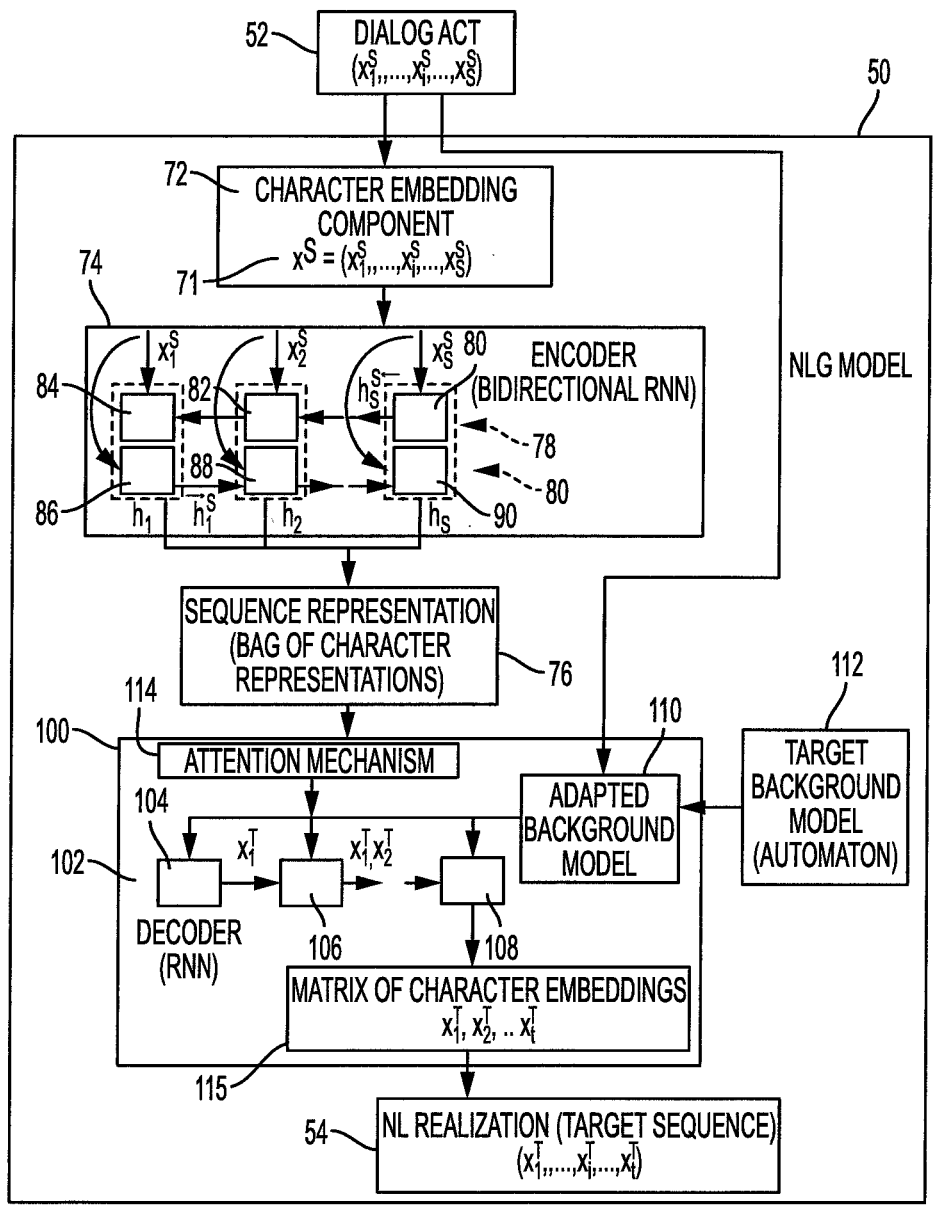
FIG. 4 is a block diagram illustrating a hierarchical neural network model for use in the system and method.

With reference now to FIG. 4, which shows the NLG model 50, the dialog act 52 is input as a string of characters, denoted ($x_1^s$, $x_2^s$, . . . , $x_S^s$), where S is the number of characters in the dialog act. A character embedding component 72 (which may be part of the model 50 or a separate component) embeds each of the characters in a multidimensional space (one dimension for each character in the alphabet 70) using one hot encoding. This may be performed using a look-up table 73. Optionally, a further projection may be applied to these embeddings (multiplying each by a weight matrix that is learned during learning of the model 50). The character embeddings 71, denoted ($x_1^s$, $x_2^s$, . . . , $x_S^s$), are input to an encoder 74, which generates a representation 76 of the character sequence 52, based on the character embeddings. The illustrated encoder is a bi-directional recurrent neural network (Bi-RNN) composed of a backward RNN 78 and a forward RNN 80. Each RNN 78, 80, is composed of a sequence of recurrent units (cells) 82, 84, 86, and 88, 90, 92, respectively, such as long short term memory (LSTM) or Gated Recurrent Unit (GRU) cells, as described, for example, in Hochreiter 1997 and Cho 2014, respectively. Each cell of the RNN takes as input the hidden state output by the previous cell (except for the first, which starts with a predefined hidden state) and a next character embedding and outputs a new hidden state. In the forward RNN 80, the first cell 86, takes as input the embedding $x_1^s$ of the first character in the sequence and outputs a hidden state $\vec{h}_1^s$, which is input to the second cell 88, together with the embedding of the second character, and so forth for the remainder of the character sequence. In the backward RNN 78, the first cell 80 takes as input the embedding $\vec{x}_S^s$ of the last character in the sequence and outputs a hidden state $\overleftarrow{h}_S^s$, which is input to the next cell 82 along with the embedding of the next to last character, and so forth until the beginning of the sequence is reached. Each hidden state is a vector of the same dimensionality.

In the sequence representation 76, each character is represented by a character representation 94 which is the concatenation of the two hidden states generated for that character, as indicated by the dashed lines in FIG. 4. The character representation 94 is denoted $h_i=(\vec{h}_i^s, \overleftarrow{h}_i^s)$, where i represents the index of the character in the sequence 52.

While the encoder 74 is illustrated as a Bi-RNN in the exemplary embodiment, in other embodiments, only one RNN is used (forward or backward).

A decoder 100 generates a natural language sequence (realization) 54, based on the set 76 of character representations 94. The decoder 100 may include an RNN 102, including a sequence of memory cells 104, 106, 108, etc., such as LSTM or GRU cells, which progressively generate characters (as character embeddings $x_i^T$) based on the embedded characters previously generated. The realization 54 is thus sequentially generated. The character generation is constrained by a background model 110, which constrains the next character generated to one which has been observed, following the previously-generated character, in the training sequences 62 or input dialog act 52. The background model 110 is composed, at inference time, from a generic background model 112, built from the training set, and the sequence of characters forming the dialog act 52.

In the exemplary embodiment, an attention mechanism 114 focuses the attention of the decoder on the character representation(s) 76 most likely to be the next to be input to the decoder RNN 102. In particular, the vector which is the current hidden state $h_{t-1}$ of the decoder cell 104, 106, 108 is compared to the character representations 76 (vectors of the same size as the hidden state) and the character representations 76 are accorded weights as a function of their similarity (affinity). A next character representation 76 from the set is then sampled from a probability distribution over the input characters which is based on the weights (normalized to sum to 1). This biases the current cell to focus on a region of the input dialog act that the current output is most related to, so that the next input character (representation) to a cell of the decoder RNN has a higher probability to be selected from that region, rather than randomly from the bag of character representations.

Each decoder cell 104, 106, 108 outputs a probability distribution over the alphabet for the next character to be generated. In one embodiment, a simple greedy approach may be used for sampling from the probability distribution, where the most probable character is selected at each time step. In another embodiment, a beam search is used to infer several probable sequences, and improve the quality of the search. At each time step, the most probable target sequences are retained.

During training, the dialog act 60 is fed into the decoder RNN at each time step and the cross entropy error (or other measure of distance from the reference sequence 62 over the training set 56) is calculated on the resulting predicted distribution.

During natural language generation, when given only the source sequence, the prediction is generated by sampling from the decoder at each time step and feeding the sampled character embedding to the next time step until an end character embedding is generated.

The whole architecture 50 can be trained end-to-end using a stochastic gradient descent algorithm.

FIG. 2 illustrates a method for natural language generation which can be performed with the system of FIG. 1. The method begins at S100.

At S102, training data 56 is provided, which includes dialog acts 60 and corresponding reference annotations 62.

At S104, a word vocabulary 63 is generated from the reference annotations 62, e.g., by the learning component 32, or may be performed manually.

At S106, a target background model 112 is built from the vocabulary 63.

At S108, the model 50 is trained, e.g., with a gradient descent technique designed to minimize the error between the realization 54 output by the model and the reference sequence 62, over the training set 56. This includes generating the target background model 112 and learning the parameters of the target background model, encoder and decoder RNNs 74, 102 and character embeddings/embedding component 72.

At S110, the trained model 50 is saved to memory of a computer, such as memory 12. This ends the training phase.

As will be appreciated, the training steps may be performed on a separate computing device from the dialog system, and given a preexisting model, steps S102-S110 can be omitted.

At S112, a new dialog act 52 to be converted to a natural language text sequence is received, e.g., by the NLG component 40 from the dialog manager 38, as discussed above.

At S114, the dialog act is input to the trained model, e.g., as a sequence of characters (or as a matrix composed of one hot vectors corresponding to the characters).

Figure 3:
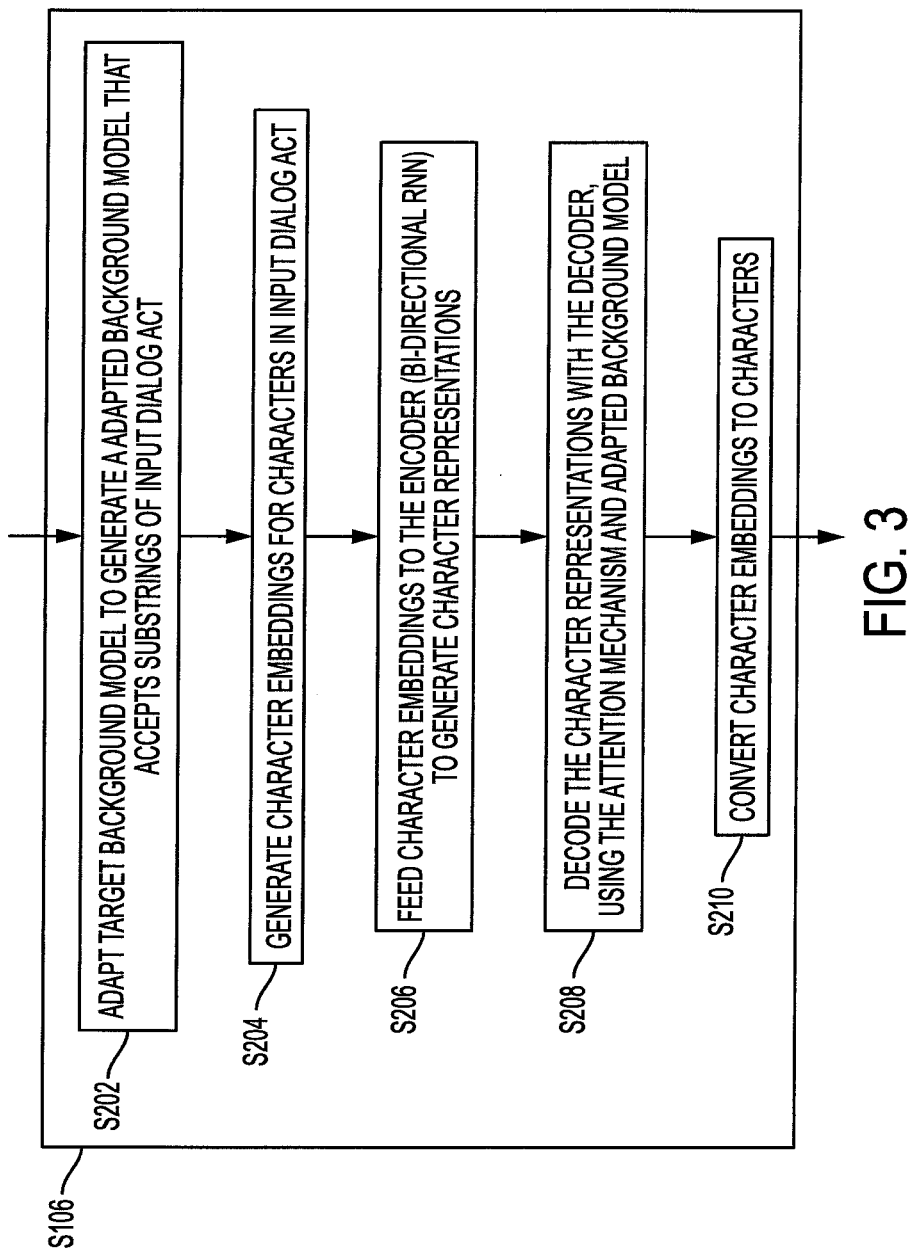
FIG. 3 is a flow chart illustrating part of the method of language generation of FIG. 2.

At S116, the trained model 50 generates a realization 54 for the input sequence of characters composing the dialog act 52. With reference also to FIG. 3, this may include adapting the target background model 112 to generate an adapted background model 110 that accepts all subsequences of the input dialog act 52 (S202), generating character embeddings 71 for characters in dialog act 52 with the character embedding component 72 (S204), encoding the character embeddings 71 with the encoder 74 to generate a bag of character representations 76 (S206), decoding the encoded bag of character representations 76 with the decoder 100 (S208), e.g., using the attention mechanism 114 and adapted background model 110 to bias the output of the model, and converting the output sequence of embedded characters from vectors to characters to generate a target natural language sequence (S210). For ease of discussion, both the output sequence of embedded characters 115 and the target sequence of characters 54 may be referred to herein as a target sequence, since there is a direct correspondence between the embedded characters (vectors) and the characters themselves. The input and target sequences 52, 54 can be input/output to/from the model 50 as matrices, consisting of one-hot encodings for each time step. Each one hot encoding is a vector of zeros, one for each character in the alphabet, except for the character encoded, which has a value of one for its element.

At S118, the generated target sequence 54 is output as an utterance (as text or as generated speech), by the output component 42, e.g., to the client device 24.

The method ends at S120.

The method illustrated in FIGS. 2 and/or 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive or independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 2 and/or FIG. 3, can be used to implement the method for generating natural language sequence from a semantic representation. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Neural Networks

Principles of neural networks will now be briefly described.

A single layer feed forward neural network can be seen as an affine transformation followed by point-wise (element-wise) nonlinearity. In the simplest form, with the given input $x \in \mathbb{R}^n$ and the parameters $W \in \mathbb{R}^{m \times n}$, $b \in \mathbb{R}^m$, the output $y \in \mathbb{R}^m$ is calculated as: $\mathbb{R}$ $$y = f(Wx + b) \tag{1}$$

where $f$ is an element-wise nonlinearity, such as sigmoid or hyperbolic tangent, and b is a bias vector.

The single layer, architecture when extended in terms of hidden layers, where each layer transforms the output of the previous hidden layer to generate output for next layer, is known as a multi-layered feed forward neural network or multi-layered perceptron (MLP).

RNN's are widely applicable over sequential data and particularly, in the case of natural language. This is because language is sequential and depends upon its neighboring context. A Recurrent Neural Network (RNN), as employed in the exemplary encoder, is a class of neural networks which is useful for processing sequential data $(x_1, x_2 \ldots, x_t)$. Hidden states calculated for a time step are used to calculate hidden states for the next time step while the parameters of the model remain the same. Each cell of the RNN computes a sequence of functions to generate an output, such as:

$$h_t = f(Wx_t + Uh_{t-1} + b^{(1)}) \tag{2}$$

$$a_t = g(Zh_t + b^{(2)}) \tag{3}$$

$$x_{t+1} \sim \text{softmax}(a_t)(a_t) \tag{4}$$

where $f$ and g are element-wise nonlinearities such as a sigmoid or hyperbolic tangent function, the input and output character embeddings are $x_t, x_{t+1} \in \mathbb{R}^n$, where n is the number of elements in each vector, the input and output hidden states $h_{t-1}, h_t \in \mathbb{R}^m$, where m is the number of elements in each vector, the weight matrixes are $W \in \mathbb{R}^{m \times n}$, $U \in \mathbb{R}^{m \times m}$, and $Z \in \mathbb{R}^{n \times m}$, and the bias terms are $b^{(1)} \in \mathbb{R}^m$ and $b^{(2)} \in \mathbb{R}^n$.

This means that the network can be unfolded, as illustrated in FIG. 4, with Eqns. 2-4 being "copied" for each time, taking the previous hidden state and input at that time step to generate the input for the next time step. This allows information to flow through the network, so that the last cell in the RNN includes information derived from all the previous cells.

An RNN model can be used for language modeling (analogous to the present decoding), to give a conditional probability distribution for the next symbol given the previously generated symbol:

$$p_\theta(x_{t+1}|x_1, x_2, \ldots, x_t) \quad (5)$$

where $\theta$ denotes the parameters of the model (W, U, Z, $b^{(1)}$, $b^{(2)}$)

The RNN models can be trained using the same stochastic gradient descent algorithm, but due to the added time dimension, the algorithm is known as Backpropagation Through Time (Werbos, "Backpropagation through time: what it does and how to do it," Proc. IEEE, 78(10):1550-1560, 1990). The loss function can be defined as the cross-entropy between the true distribution and target distribution:

$$-\log p_\theta(x^*_{t+1}|x_1, x_2, \ldots, x_t) \quad (6)$$

where $x^*_{t+1}$ is the true symbol observed in the training data at that time step. In existing language modeling systems, the symbols are generally words, rather than characters, as is the case here. The learning rate, which governs the extent to which the model is adapted to reduce the cross-entropy cost, can be varied throughout the learning, allowing the cells to adapt more quickly when the cross-entropy is higher, and then more slowly as the cross-entropy decreases.

RNNs, in general, suffer from a problem of vanishing gradients as the sequence gets longer. This makes it increasingly difficult to train the network to learn long range dependencies (Bengio, et al., "Learning long-term dependencies with gradient descent is difficult," IEEE Trans. on Neural Networks, 5(2):157-166, 1994). To address this this, Hochreiter 1997 introduced Long Short Term Memory (LSTM), which are "gated" recurrent neural networks. They handle long range dependencies by maintaining a memory cell along with a hidden state for each step.

Figure 5:
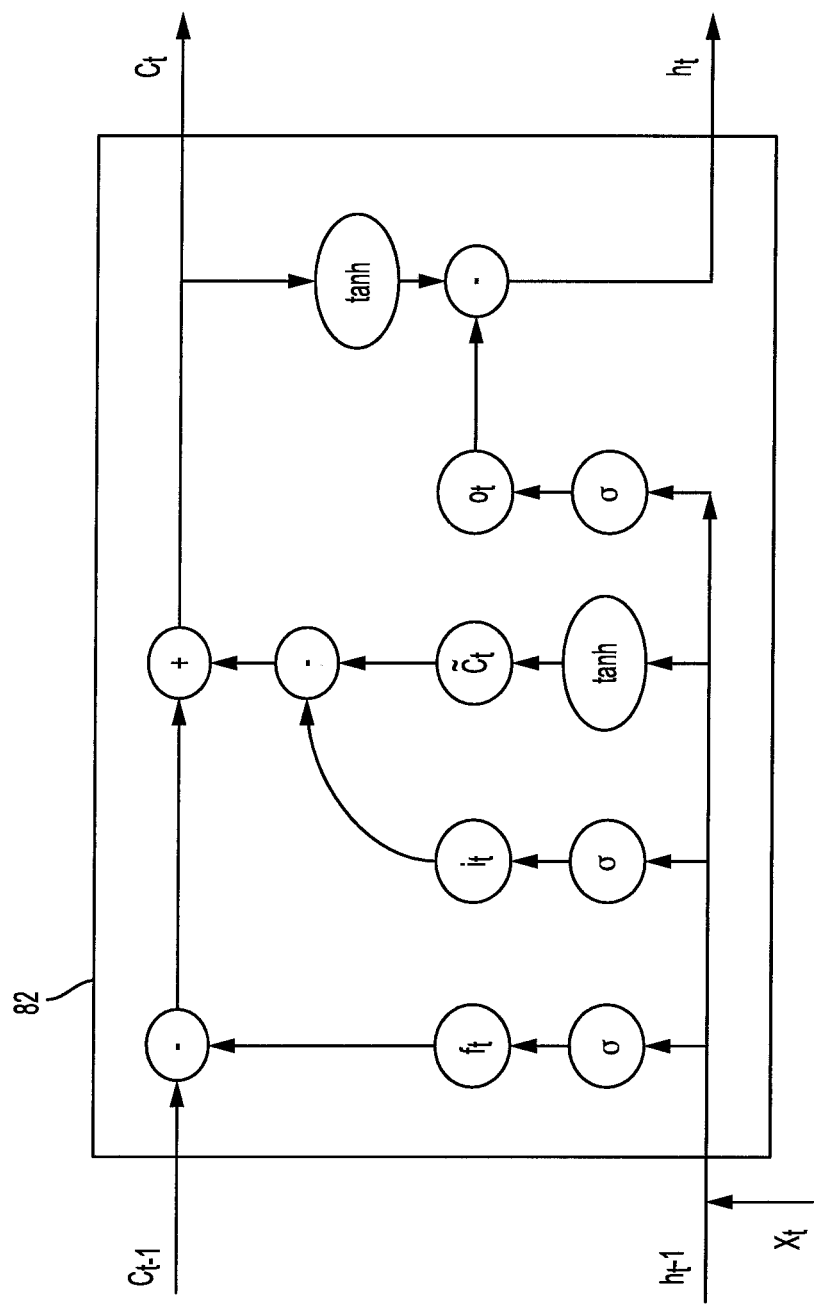
FIG. 5 is a block diagram illustrating a recurrent unit which may be employed in the model of FIG. 4.

FIG. 5 shows an exemplary LSTM cell 82, which may be used in the encoder and/or decoder (see, Gers, et al., "Learning to forget: Continual prediction with LSTM," Neural computation, 12(10):2451-2471, 2000). The LSTM includes different units: an input gate $i_t$, a forget gate $f_t$, an output gate $o_t$, a memory cell $c_t$ and a hidden state $h_t$. Each unit is of same dimension $\mathbb{R}^d$. The equations for an LSTM cell are:

$$i_t = \sigma(W^{(i)}x_t + U^{(i)}h_{t-1} + b^{(i)}) \quad (7)$$

$$f_t = \sigma(W^{(f)}x_t + U^{(f)}h_{t-1} + b^{(f)}) \quad (8)$$

$$o_t = \sigma(W^{(o)}x_t + U^{(o)}h_{t-1} + b^{(o)}) \quad (9)$$

$$\tilde{c}_t = \tan h(W^{(c)}x_t + U^{(c)}h_{t-1} + b^{(c)}) \quad (10)$$

$$c_t = f_t \odot c_{t-1} + i_t \odot \tilde{c}_t \quad (11)$$

$$h_t = o_t \odot \tan h(c_t) \quad (12)$$

where $\odot$ represents element-wise product and $x_t$ is the input at the current time step. The matrices $W^{(i)}$, $W^{(f)}$, $W^{(o)}$, $W^{(c)}$, $U^{(i)}$, $U^{(f)}$, $U^{(o)}$, $U^{(c)}$, are the parameters to learn, $\sigma$ represents an element-wise sigmoid function, and tan h the element-wise hyperbolic tangent. From the above equations, it can be observed that the memory cell state $c_t$ is controlled by the input and forget gates. The forget gate controls the information flow from previous memory cell $c_{t-1}$ and the input gate controls the addition of new information from $\tilde{c}_t$. Hence, the model is able to learn long range dependencies by selectively controlling the memory flow. In the case of the first cell in the RNN, there is no prior cell to input a hidden state $h_{t-1}$, or a previously-generated $c_{t-1}$, so $h_{t-1}$ and $c_{t-1}$ may be initialized, for this cell, with predefined values.

The present system and method are not limited to LSTM cells. For example GRU memory cells may be employed.

A bidirectional RNN, as used in the present encoder 74, includes two RNNs 78, 80 that run in parallel, one in a forward direction and the other in a backward direction. Each uses the same set of equations (7)-(12) in its cells, but with different parameter matrices and bias terms. See for example, Graves, et al., "Speech recognition with deep recurrent neural networks," 2013 IEEE Int'l Conf. on Acoustics, Speech and Signal Processing (ICASSP), pp. 6645-6649. (2013). At each time step, the resulting hidden states from both RNNs are concatenated and are used for encoding the input sequence. For example, $h_2 = (\overleftarrow{h}_2^s, \overrightarrow{h}_2^s)$, i.e., a concatenation of the hidden states output by cells 82 and 88. The principle is that a word occurring in a sentence depends on its neighboring context. Since a forward RNN encodes information about the previous words, a backward RNN, which encodes information about the next words, is run in addition to the forward RNN. Hence, a concatenation of representations for each character given by these two RNN's gives the representation which encodes the information about neighboring left and right contexts.

Attention Mechanism

Figure 6:
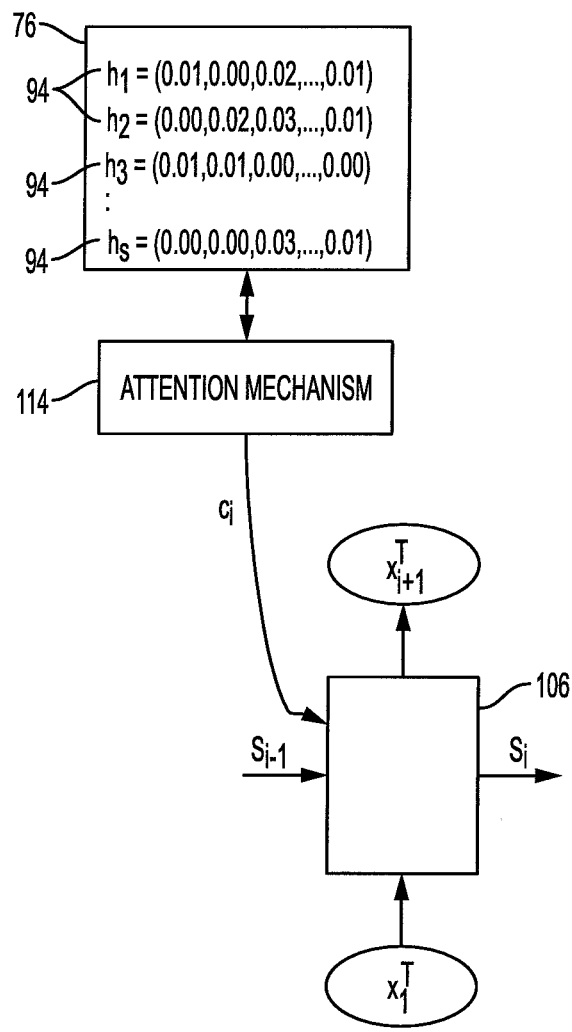
FIG. 6 is a block diagram illustrating an attention mechanism operating in the model of FIG. 4.

For the encoder, a one-direction RNN 102 is used. A conventional sequence to sequence model encodes a sequence into a fixed vector representation. This fixed vector representation creates a bottleneck when trying to encode information in long sequences, as noted in Bahdanau 2014. An attention mechanism 114, as illustrated in FIG. 6, relaxes this constraint. Instead of having information encoded in a fixed vector, it dynamically weighs information from each time step of the source sequence 76. The output 76 of the encoder is thus treated as a bag of hidden vectors 94 and the decoder is therefore not limited to drawing them in sequence. This means that, while inferring a next character, the network 102 can "attend" to some specific parts of the dialog act 52.

Briefly, the attention mechanism computes an attention weight for each of the characters in the input sequence 52. The attention weight is based on the affinity (similarity) between the current hidden state of a cell and the respective hidden vector 94. An aggregate of the attention-weighted hidden vectors is computed and used to retrieve the most similar hidden vector 94 as the input to the cell.

To explain this further, let the hidden vectors 94 from the bidirectional RNN 74 for the source sequence be represented by $(h_1, h_2, \ldots, h_S)$. Let $s_i$ be the hidden state at $i^{th}$ step of decoding. A score $e_{ij}$ for the $j^{th}$ hidden vector $h_j$ of the source sequence can be computed as a function of $h_j$ and $s_{i-1}$:

$$e_{ij} = v_a^T \tan h(W_a s_{i-1} + U_a h_j) \quad (13)$$

where the parameters are $W_a \in \mathbb{R}^{n_a \times n_h}$, $U_a \in \mathbb{R}^{n_a \times 2n_h}$, $v_a \in \mathbb{R}^{n_a}$. $n_a$ is the number of units used for attention, $n_h$ is number of elements used for the hidden state, and T represents the transpose operator.

The weight $\alpha_{ij}$ for each hidden vector $h_j$ can be a softmax function over the scores:

$$\alpha_{ij} = \frac{\exp(e_{ij})}{\sum_{k=1}^{S} \exp(e_{ik})} \quad (14)$$

A context vector $c_i$ is then calculated as the weighted sum of hidden vectors:

$$c_i = \sum_{j=1}^{S} \alpha_{ij} h_j \quad (15)$$

The equations for the LSTM cells 104, 106, 108 now take into account the context vector $c_i$:

$$i_i = \sigma(W^{(i)} x_i^T + U^{(i)} s_{i-1} + C^{(i)} c_i + b^{(i)}) \quad (16)$$

$$f_i = \sigma(W^{(f)} x_i^T + U^{(f)} s_{i-1} + C^{(f)} c_i + b^{(f)}) \quad (17)$$

$$o_i = \sigma(W^{(o)} x_i^T + U^{(o)} s_{i-1} + C^{(o)} c_i + b^{(o)}) \quad (18)$$

$$c_i^g = \tan h(W^{(c)} x_i^T + U^{(c)} s_{i-1} + C^{(c)} c_i + b^{(c)}) \quad (19)$$

$$c_i^g = f_i \odot c_{i-1}^g + i_i \odot \bar{c}_i^g \quad (20)$$

$$s_i = o_i \odot \tan h(c_i^g) \quad (21)$$

where $c_i^g$ and $c_i$ are the memory cell state and the context vector at $i^{th}$ time step respectively. $x_i^T$ is the $i^{th}$ character embedding for the target sequence, (which can be converted to the character itself with the look-up table 73). $\sigma$ represents the sigmoid function, tan h is the hyperbolic tangent. $W^{(i)}$, $U^{(i)}$, $C^{(i)}$, $W^{(f)}$, $U^{(f)}$, $C^{(f)}$, $W^{(o)}$, $U^{(o)}$, $C^{(o)}$, $U^{(c)}$, $U^{(c)}$, $C^{(c)}$ are parameters (weight matrices) for the model to learn, and $b^{(i)}$, $b^{(f)}$, $b^{(o)}$, $b^{(c)}$, are bias terms that are selected experimentally. $f_i$ and $o_i$ are intermediate states.

Finally, a conditional probability $\alpha_O$ for the next character embedding to be output is defined as, $$a_\theta(x_{i+1}^T | x_i^T, x_{i-1}^T, \ldots x_1^T, x^S) = f(x_i^T, s_i, c_i) \quad (22)$$

where $x^S$ is the source sequence 52 and $x^T$ is the target sequence.

The function $f$ can be written as:

$$f(x_i^T, s_i, c_i) = \text{softmax}(W_o x_i^T + U_o s_i + C_o c_i + b_o) \quad (23)$$

where $W_o \in \mathbb{R}^{|V| \times n_e}$, $U_o \in \mathbb{R}^{|V| \times n_h}$, $C_o \in \mathbb{R}^{|V| \times n_h}$, $b_o \in \mathbb{R}^{|V|}$, $n_e$ is the size of character embedding and $|V|$ is the size of alphabet. $\alpha_O$ is a vector of probabilities, one for each character in the alphabet. In the exemplary embodiment, these probabilities are adapted by the background model 110 to bias the output of the RNN 102 towards producing character sequences which correspond to valid vocabulary words and/or are copied from subsequences of the input.

The attention mechanism 114 can be in the form of a single layer perceptron with a sequence of cells for calculating attention weights.

Adaptor—Background Process

To incorporate prior knowledge into the decoder 100, an adaptor-background process is employed, which also helps the training regime where available data is insufficient. This approach is described in Dymetman, et al., "Log-Linear RNNs: Towards Recurrent Neural Networks with Flexible Prior Knowledge," arXiv: 1607.02467, pp. 1-22 (2016) and is related to the technique for exploiting a priori constraints introduced in Xiao, et al., "Sequence-based structured prediction for semantic parsing," Proc. Association For Computational Linguistics, pp. 1341-1350 (2016), in the context of semantic parsing. This approach is now briefly described.

The adaptor part of the process uses the RNN 102, which defines a conditional probability distribution $a_\theta(x_{t+1}|x_1, x_2, \ldots, x_t; x^S)$, as discussed above, where $x_1, x_2, \ldots, x_t$ are the already generated characters of the target sequence 54 and $x_{t+1}$ is the character being generated. The RNN-based language model is parameterized by the matrix parameters ($W_o$, $U_o$, $C_o$ in Eqn. 23), denoted $\theta$, and conditioned on previously generated tokens and context information.

The background-adaptor process extends this to compute an overall conditional probability distribution as a function of first and second conditional probability distributions (e.g., a dot product), as follows:

$$p_\theta(x_{t+1} | x_1, x_2, \ldots, x_t; x^S) \propto \quad (24)$$

$$\underbrace{a_\theta(x_{t+1} | x_1, x_2, \ldots, x_t; x^S)}_{\text{Adaptor}} \cdot \underbrace{b_g(x_{t+1} | x_1, x_2, \ldots, x_t; x^S)}_{\text{Background}}$$

The adaptor is the standard RNN 102 prediction while the background prediction ($b_g(x_{t+1}|x_1, x_2, \ldots, x_t; x^S)$) incorporates prior knowledge in terms of a predefined arbitrary conditional language model which has been adapted to generate the adapted background model 110. The model 110 can be generated from a target background model 112, which, in turn, is built, during the training of the model 50, from the word vocabulary 63. The adapter and the background parts are both vectors which include a probability value for each character in the alphabet (each probability value is normalized to sum to 1). The combined prediction $p_\theta$ from a cell 104, 106, 108, etc., is thus obtained by element-wise multiplication of the adaptor and background probabilities. Thus, if the background vector $b_g$ has a value of 0 for one of the characters, the product of the adaptor and background probabilities will be 0 for that character. The final probability $p_\theta$ is proportional to the product of probabilities given by adaptor and background processes and is parameterized by $\theta$. The background and adaptor can be normalized over the different possible alphabet symbols $x_{t+1}$ to obtain a probability distribution (as indicated by the proportionality symbol $\propto$). Overall, training can be achieved with only a small modification of the log-loss for taking into account the background factor.

The effect of the combined process of Eqn. 24 can be considered for two extreme cases:

1. In the case where the background process is a uniform distribution over the alphabet, then the combined process essentially becomes the adaptor process, that is identical to a standard RNN. Here no prior information from the background process is gained.

2. In the case where the background process is the true distribution over the target alphabet, then the process is complete without the adaptor process. Hence, the adaptor should learn not to change the probabilities given by the background process, since all the information is present in the background distribution. Thus, it becomes easy to train the adaptor process as it only has to learn a uniform distribution over the target alphabet.

A generalization of these two extreme cases is employed to address the intermediate situations. In the exemplary embodiment, therefore, neither the adaptor part nor the background part is a uniform probability distribution for all cells of the decoder RNN, so both parts influence the next character emitted. It is assumed that the true distribution of the target sequence cannot be learned. However, the background process may incorporate some prior information (for example, a generic language model trained on a large corpus), which the adaptor can leverage in order to adapt more easily to the training data (for example, a small in-domain corpus). In the exemplary method, the background process provides some hard or soft constraints that the generated symbols have to conform to, presented in the form of finite-state automata. The prior knowledge incorporated in the background process is leveraged by the adaptor process to fit the training data better.

Finite State Acceptor as Background Model

Figure 7:
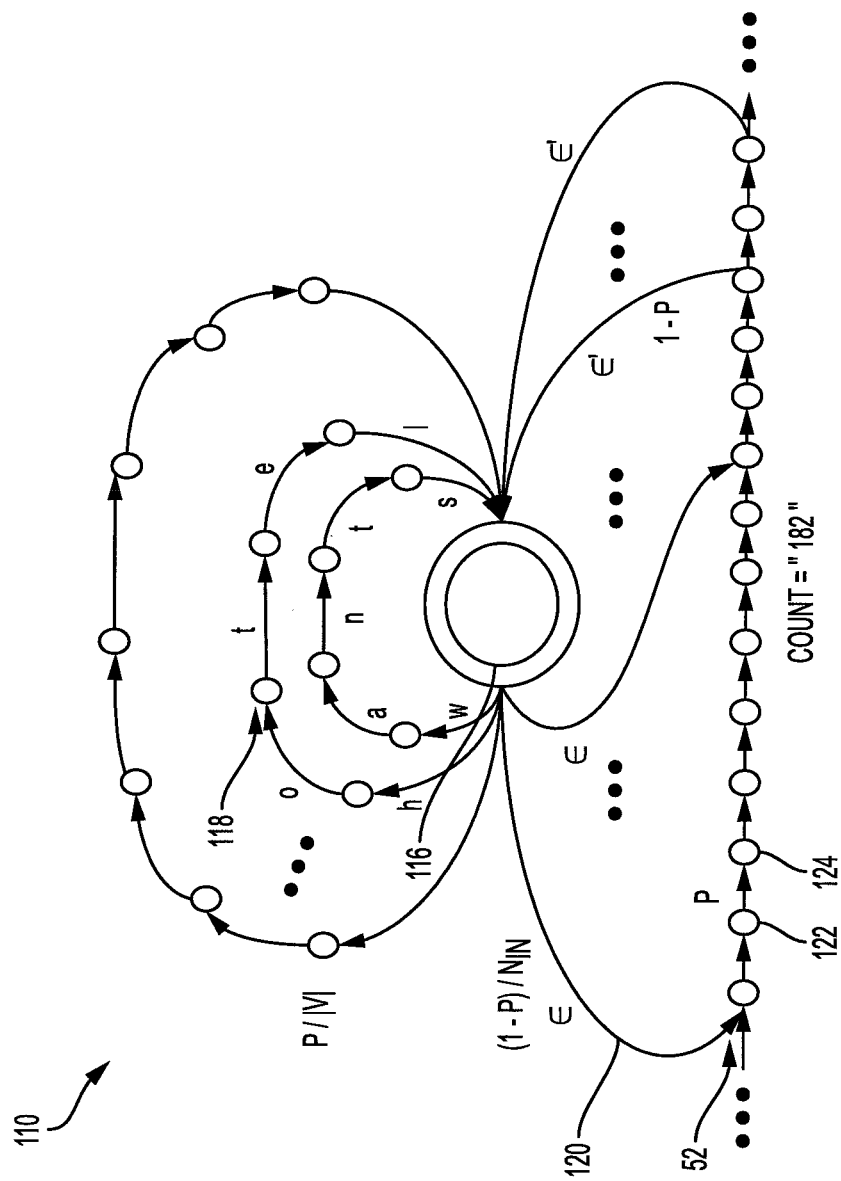
FIG. 7 schematically illustrates an example background model in the hierarchical model of FIG. 4.

As illustrated in FIG. 7, a finite state acceptor (FSA), such as a weighted finite state acceptor (WFSA), can be used as the adapted background model 110, which accepts:

1. All words from the target vocabulary 63: All words from the target vocabulary 63 are accepted at the character-level. The rationale behind this is to constrain the character-based adaptor 102 so as not to generate any non-words.

2. All substrings from the source dialog act 52: The FSA 110 has the freedom to transition to any state of the dialog act and transition back from any state later in the dialog act. These transitions are illustrated by the arrows labeled ∈ and ∈', respectively This allows incorporation of prior knowledge from the input dialog act 52. In this way, the combined model 110 can copy named entities or a sequence of digits from any part of the dialog act.

The FSA 110 can be generated by combining the dialog act 52 with a target FSA 112, which accepts only the words from the target vocabulary 63. The target FSA is built at training time and stored in memory 12.

An advantage of using a background process is that the character-level model has the capacity to exploit original dialog acts without de-lexicalization. This is in contrast to word-level model, which may produce non-words and strings of characters that have no evidence in the input dialog act. Using the background process here constrains the resulting model and avoids these issues.

The exemplary adapted background FSA 110 shown in FIG. 7 includes vocabulary words, such as 'hotel' and 'wants'. Only a few words are illustrated by way of example. On the dialog act side, the acceptor is free to accept the number '182' during the generation process. The large central state 116 is both an initial and a final state. The probabilities for the adapted background FSA 110 may be chosen heuristically. The probabilistic weights on the arcs 118, 120, etc., may be parametrized through a single parameter P∈[0; 1]. For example, P is from 0.1 to 0.99, such as at least 0.7, or at least 0.8, or up to 0.95. The total mass of transitions from the start state to one of the vocabulary words is P and the remaining mass 1−P is used for the transitions to the input dialog act. The probabilities may be assigned as follows: For vocabulary words (e.g., "hotel"), the probabilities may be distributed uniformly among the words, i.e., each vocabulary word has a probability of P/|V|, where |V| is the size of the vocabulary. For the input dialog act, the probability to take a transition arc ∈ 120 into the input dialog act 52 is $(1-P)/N_{in}$, where $N_{in}$ is the number of arcs transitioning from the final state to the input dialog act (which may be equal to the number of characters in the dialog act 52). Once in a position in the dialog act, a probability P is defined to transition between states 122, 124, etc., in the input dialog act. And, the probability to escape from input dialog act to the final state is 1−P. This results in a higher probability of continuing with the states of the dialog act (once a transition E to the dialog act has been made) than for returning to the central state. In the illustrated embodiment, this favors adding the number "182" to the output, for example, rather than "18". Similarly, having accepted "hot", the next state is more likely to be the "e" of the arc "hotel", rather than to make a transition to a character of the dialog act. The transitions E do not result in an additional character being added to the target sequence, just a transition from the target background part of the automaton 110 to the dialog act part, or vice versa.

An example model 50 may be implemented in Python using Theano and Lasagne libraries (see, Bastien, et al., "Theano: new features and speed improvements," arXiv: 1211.5590, pp. 1-10 (2012); Dieleman, et al., Lasagne: First release, (2015), available at https://zenodo.org/record/27878#.WBumnmorKUk). The attention mechanism of Bahdanau 2014 can be implemented explicitly for the encoder-decoder framework by modifying the LSTM class of the Lasagne library. For implementing the finite state automaton, a Python wrapper of OpenFST, known as PyFST, can be used. The automaton obtained after E-removal are determinized using this tool and dumped in the form of Theano matrices, as follows:

1. State Transition Matrix:

This matrix is of the size $n \times |V_o|$, where n is the total number of states in the automaton 110, 112 and $|V_o|$ is the size of the alphabet 70. Since the automaton is deterministic, a state can have at most one transition with the same input symbol. The matrix is constructed as:

$$S_{ij} = \begin{cases} k, & \text{if } \exists \text{ a transition from the } i^{th} \text{ state to } k^{th} \text{ state} \\ & \text{with } j^{th} \text{ input symbol in } V_o \\ -1, & \text{otherwise} \end{cases} \quad (25)$$

Therefore, an $i^{th}$ row of the resulting matrix describes to what states the automaton can transition to corresponding to each symbol in the alphabet.

2. Probability Transition Matrix:

This matrix is of the same size as the state transition matrix, i.e., $n \times |V_o|$. The only difference is that the entries now describe the probability for the transition.

$$P_{ij} = \begin{cases} p_{ij}, & \text{if } \exists \text{ a transition from the } i^{th} \text{ state to } S_{ij}^{th} \text{ state} \\ & \text{with } j^{th} \text{ input symbol in } V_o \\ 0, & \text{otherwise} \end{cases} \quad (26)$$

The above matrices are obtained for training, development and test sets separately and then are fed as external variables into the Theano code.

The probability for the combined process is calculated in the LSTM class by modifying the RNN probabilities. This is done by performing element-wise multiplication and normalization with the background process probabilities.

The most probable character may be output at each time step or a beam search may be used to sample utterances from the obtained conditional language model. In the beam search, at each time step, a set of K most probable sequences is selected and used as inputs to the next step. K may be, for example, from 2-10, such as 5.

Training the NLG Model (S108)

In an exemplary embodiment, bias terms are selected for the RNNs (e.g., heuristically) and the other parameters (weight matrices) are then learned with an iterative process, such as stochastic gradient descent. In this method, character embeddings 71 of the training sequences are generated by the embedding component 72 and fed into the encoder 74. The model 50 is initialized with a set of parameter values which are iteratively refined to minimize the error between the realization 54 output by the model 50 and the reference sequence 62 assigned to the training sample. Training may be performed in batches, with the parameters being updated after each batch.

In one embodiment, the method described in Kingma, et al., "Adam: A method for stochastic optimization," arXiv: 1412.6980, 2014, is used for training the model. This approach has an advantage in that it only requires first-order gradients with little memory requirement. The method computes individual adaptive learning rates for different parameters from estimates of first and second moments of the gradients.

All the components 74, 100, 102 in the model are jointly trained using, for example, the negative log likelihood as the objective function to be minimized over the n samples in the training set:

$$-L(\theta) = -\frac{1}{n}\sum_{i=1}^{n} \log p_\theta(x_i^R),$$

where $x_i^R$ is the $i^{th}$ reference sequence in the training set, $\theta$ is the collection of weight matrices for the model 50 to learn, and $p_\theta$ is the probability defined by equation (24).

Without intending to limit the scope of the exemplary embodiment, the following examples illustrate the application of the method.

EXAMPLES

Experiments were performed using the character-based attention encoder-decoder framework detailed above. For decoding, a greedy approach is used to sample from the conditional probability distribution by taking the most probable character at each step.

The following are the notations used for example samples below:
1. [D-ACT]: Dialog Act or the source sentence,
2. [REFERENCE]: True reference utterance,
3. [PREDICTION]: Utterance generated by the model.

Dataset

The dataset used for the following experiments was collected by Wen 2015 using crowdsourcing. It includes two domains, hotel and restaurant. Each domain includes dialogue acts 60 along with their corresponding natural language realizations 62. Each dialogue act is a combination of slot-value pairs of the information to be conveyed. There are eight dialogue act types such as inform, request, reject etc., and twelve slots such as name, pricerange, phone, etc.

Experiments were performed on the hotel domain of the dataset. The data contains 5373 samples, which were split into training, development and test sets in a ratio of 8:1:1.

The FSA 112, 110 is implemented in Python using PyFST, which is also used to perform ∈-removal and determinization; it is then exported in the form of Theano matrices, as described above. The attention mechanism 114 of Bahdanau 2014 is implemented explicitly for the encoder-decoder framework by modifying the LSTM class of the Lasagne library.

1. Evaluation of Word-Level and Character-Level Models
   Word-Level Model
   A Word-Level Attention based encoder-decoder LSTM was evaluated for comparison with the exemplary character-based model. In this model, words are used as symbols for each time step. The size of the vocabulary is 563 and a maximum length of the target sentence is 45.

The following are a few sample predictions. The named entities are de-lexicalized for the word-level model to work.

1. [D-ACT]: inform (type=hotel; count=<COUNT>; internet=dont_care)
   [REFERENCE]: <START> there are <COUNT> hotel -s if it does not matter if they have internet or not <END>
   [PREDICTED]: there are <COUNT> hotel -s if you do not care whether they include internet or not.
2. [D-ACT]: <START> inform (name=<NAME>; phone=<PHONE>; postcode=<POSTCODE>)<END>
   [REFERENCE]: <START> the phone number for <NAME> is <PHONE>. its postal code is <POSTCODE>. <END>
   [PREDICTED]: the phone number for the <NAME> is <PHONE> and the postcode is <POSTCODE>.
3. [D-ACT]: <START>? confirm (near=dont_care) <END>
   [REFERENCE]: <START> can i confirm that you do not care what is near the hotel ?<END>
   [PREDICTED]: can i confirm that you do not care what area the hotel is near ?

Character-level Models

A Character-Level Attention based encoder-decoder LSTM was evaluated. In this model, characters are used as the symbol at each time step. The data is not de-lexicalized. The size of the alphabet is 51 and a maximum length of the target sentence is 205.

Three different variants of the character-level model were evaluated:
1. [C]: Character-based attention RNN with no background process.
2. [C-NWFSA]: Character-based attention RNN with non-weighted FSA background.
3. [C-WFSA]: Character-based attention RNN with weighted FSA background.

All of the systems are trained with the same set of hyperparameters to ensure fair comparison:

The RNNs of the bidirectional encoder 74 have 300 hidden units each, similarly the decoder RNN 102 has 300. The number of hidden units used in the single layer perceptron 114 for calculating the attention weights is 100.

For training, stochastic gradient descent was used, together with Adam (Kingma 2014) updates, with an initial learning rate of 0.001. A small minibatch of size 20 is chosen due to GPU memory constraints when storing FSA matrices for each sample contained in the minibatch. After the training procedure, beam search is used to sample utterances from the obtained conditional language model. A beam of length 5 is used to obtain the top 5 realizations and the one with highest probability is selected as the prediction.

The P parameter of the weighted FSA is fit to the data by performing a search over the list of values [0.99; 0.95; 0.9; 0.8; 0.7; . . . , 0.1]. Log-likelihood of the training dataset is used as the optimization criterion, calculated as the sum of log probabilities of all target realizations present in the training set. The maximum likelihood is obtained for P=0.9, for hotel and for restaurant datasets, and this P is used in all experiments.

The average number of states present in the deterministic weighted FSAs of the training samples is approximately 70K and 120K for hotel and restaurant domains, respectively.

The BLEU-4 metric is chosen for automatic evaluation (Papineni, et al., "BLEU: a method for automatic evaluation of machine translation," Proc. 40th ACL annual meeting, pp.

311-318 (2002); available at http://www.itl.nist.gov/iad/mig/tests/mt/2009/). TABLE 1 shows the results obtained.

TABLE 1

Results for Character-Based Models

| Model | BLEU Score | |
| --- | --- | --- |
| | Hotel | Restaurant |
| C | 0.3753 | 0.3899 |
| C-NWFSA | 0.3820 | 0.3537 |
| C-WFSA | 0.4418 | 0.4214 |

Manual Evaluation

For manual evaluation, metrics are defined as follows:
1. Adequacy
Precision or "Correctness" [1/0]: all the information in the input dialog act is present in the generated utterance.
Recall or "Completeness" [1/0]: all the information in the generated utterance is present in the input dialog act.
2. Fluency
No non-words [1/0]: if all the words in the generated utterance are present in the vocabulary or in the input dialog act.
Non-redundant [1/0]: if there is no repeated information in the generated utterance.
Natural or "good English" [2/1/0]: if the generated utterance has "good" English (grammatical and natural). 2 implies both non-redundant and no non-words.

TABLE 2 shows the results.

TABLE 2

Manual Evaluation of Character-based models

| | Adequacy | | Fluency | | |
| --- | --- | --- | --- | --- | --- |
| Model | Precision | Recall | No non-words | Non-redundant | Natural |
| C | 0.784 | 0.760 | 0.840 | 0.942 | 1.587 |
| C-NWFSA | 0.847 | 0.747 | 0.936 | 0.940 | 1.644 |
| C-WFSA | 0.951 | 0.879 | 0.990 | 0.951 | 1.853 |

The results suggest that the character-level language generator is able to "copy" information from the source dialog to the target utterance. This generator is able to use original data without any kind of pre-processing. The adaptor-background framework forces the character-level model to avoid generating any non-words or false information by incorporating prior knowledge in the form of finite state acceptor. This character-level model with the background process is able to perform better than the related methods.

An advantage of the character-level model comes from the use of all the information present in the source dialog. Such a model is then able to take morphological variance of a language into account. Also, the prior used in the examples is generalized to take any sequential representation as its input.

A few sample predictions which are taken randomly for the models discussed above are provided in TABLE 3.

TABLE 3

Character Level RNNS

| Source dialog act | True reference utterance generated by a human | Prediction utterance by the model | | |
| --- | --- | --- | --- | --- |
| | | Character-Level RNN without background process | Character-Level RNN with non-weighted FSA | Character-Level RNN with weighted FSA |
| inform(name='hotel stratford';dogs_allowed='no') | * the hotel stratford does not allow dogs . # | hotel stratford does not allow dogs . | the hotel stratford does not allow dogs . | hotel stratford does not allow dogs . |
| inform_no_match (area='excelsior') | * there is no hotel in excelsior . # | there is no match for a hotel in the castice in exeensevice | there is no match in the ea very inexpensive | there are no hotel -s in the excelsior area . |
| inform_no_match (area='telegraph hill') | * there are no hotel -s near telegraph hill # | there are no hotel -s in telegraph hill . | there are no hotel matches in telegraph hill | there are no hotel -s in the telegraph hill area . |
| - ?select(accepts_credit_cards='yes'; accepts_credit_cards='no') | - * would you prefer a hotel that accepts credit card -s or do you not care ? # | - would you like to know if they accept credit card -s? | - do you need a hotel that accepts credit card -s ? | - would you like to know if they accept credit card -s ? |
| inform_no_match (area='lower pacific heights') | * there are no notels in the lower pacific heights area # | i am sorry but there are no hotel -s in lower pacific heights . | i am sorry, but it seems in lower place in lower pacific heights . | i am sorry but there are no hotel -s in lower pacific heights area . |
| inform(name='inn at the presidio';phone='4158007356') | * the phone number for the inn at the presidio is 4158007356 . # | the inn at the presidio 's phone number is 4158007356 | the inn at the presidio 's phone number is 4158007356 | - the inn at the presidio is a nice hotel and their phone number is 4158007356 . |

TABLE 3-continued

Character Level RNNS

| Source dialog act | True reference utterance generated by a human | Prediction utterance by the model | | |
|---|---|---|---|---|
| | | Character-Level RNN without background process | Character-Level RNN with non-weighted FSA | Character-Level RNN with weighted FSA |
| - inform(name= 'hyatt fisherman 7s wharf';price_range= 'pricey'; phone= '4155631234') - | * the hyatt fisherman 7s wharf is in the pricey price range and the phone number is 4155631234 # | - the hyatt fisherman 7s wharf is pricey . the phone number is 4155631234 . | - the hyatt fisherman 7s wharf hotel is pricey hotel is 4155631234 . | - the hyatt fisherman 7s wharf phone number is 4155631234 . |
| inform(name= 'hotel kabuki';near= 'japantown';dogs_ allowed='yes') | * the hotel kabuki in japantown allows dogs # | hotel kabuki is near japantown and they allow dogs . | hotel kabuki near japantown allows dogs . | hotel kabuki is near japantown and they allow dogs . |
| - inform(name= 'parker guest house';area= 'mastro';address= '520 church st'; phone= '4156213222') | - * parker guest house is near mastro at 520 church st . their phone number is 4156213222 # | - the parker guest house is the oduer of markin sunt reach can breac for you can bi clubert is 4156213222 . | - the parker guest house is located at 222 house locate and the phone number is 4156213222 . | - the parker guest house is located at 520 church st . the phone number is 4156213222 . |
| - inform(name= 'noe 7s nest bed and breakfast';area= 'transmission'; price_range= 'moderate') | - * there is noe 7s nest bed and breakfast in the transmission area in the moderate price range . # | - noe 7s nest bed and breakfast is in the moderate price range . | - noe 7s nest bed and breakfast is in the moderate price range . | - noe 7s nest bed and breakfast is in the transmission area that are pricey . |
| inform(name= 'the tuscan best western plus';phone= '4155611100') | * the tuscan best western plus , phone is 4155611100 # | the phone number of the tuscan best western plus is 4155611100 | the phone number of the tuscan best western plus is 4155611100 . | the tuscan best western plus is a hotel in 4155611100 . |
| inform_no_match (area='north park') | * there are no hotel -s in the north park area . # | there are no hotel -s in north park . | there are no hotel -s in north park . | there are no hotel -s in north park . |
| inform(name= 'taj campton place';type='hotel') | * the taj campton place is a nice hotel . # | the taj campton place is a nice hotel . | the taj campton place is a nice hotel . | the taj campton place is a nice hotel . |
| - inform_no_match (area='ingleside heights') | - * there are no hotel -s in the area of ingleside heights . # | - there is no match for a hotel in the area of in lowetheng hotel in the haight in the area of the hotel in the area of the hotel in the area of the hotel in the area of | i am sorry, but i hotel near the inexpensive hotel -s in the area of ingleside heights . | - i am sorry but there are no hotel -s in the area of ingleside heights . |
| - inform(name= 'hotel drisco';address= '2901 pacific ave';phone= '4153462880') | - * the address for hotel drisco is 2901 pacific ave . and the phone number is 4153462880 . # | - hotel drisco address is 2901 pacific ave , the phone number is 4153462880 . | - hotel drisco is located at 2901 pacific ave , and their phone number is 4153462880 | - hotel drisco is located at 2901 pacific ave and the phone number is 4153462880 . |
| inform(name= 'larkspur hotel union square';dogs_ allowed='yes') | * the larkspur hotel union square allows dogs . # | the kamksr goutt hotel near north beach that allows dogs . | larkspur hotel narrow soma does allow dogs . | the larkspur hotel union square allows dogs |
| inform_no_match (area='north waterfront') | * i am sorry but there are no hotel -s in the area of north waterfront . # | i am sorry but there are no hotel near the wottrarea | - i am sorry but there are no hotel -s in the near whether hotel | - i am sorry but there are no hotel -s in the area of north waterfront . |

TABLE 4 shows the accuracy and fluency for the first two examples in TABLE 3.

TABLE 4

Accuracy and fluency for character-level models

| Model | Adequacy | | Fluency | | |
| --- | --- | --- | --- | --- | --- |
| | Precision | Recall | No non-words | Non-redundant | Natural |
| EXAMPLE 1 | | | | | |
| C | 0 | 0 | 0 | 1 | 0 |
| C-NWFSA | 0 | 0 | 1 | 1 | 1 |
| C-WFSA | 1 | 0 | 1 | 1 | 2 |
| EXAMPLE 2 | | | | | |
| C | 0 | 0 | 0 | 1 | 0 |
| C-NWFSA | 0 | 0 | 0 | 1 | 0 |
| C-WFSA | 1 | 1 | 1 | 1 | 2 |

Figure 8:
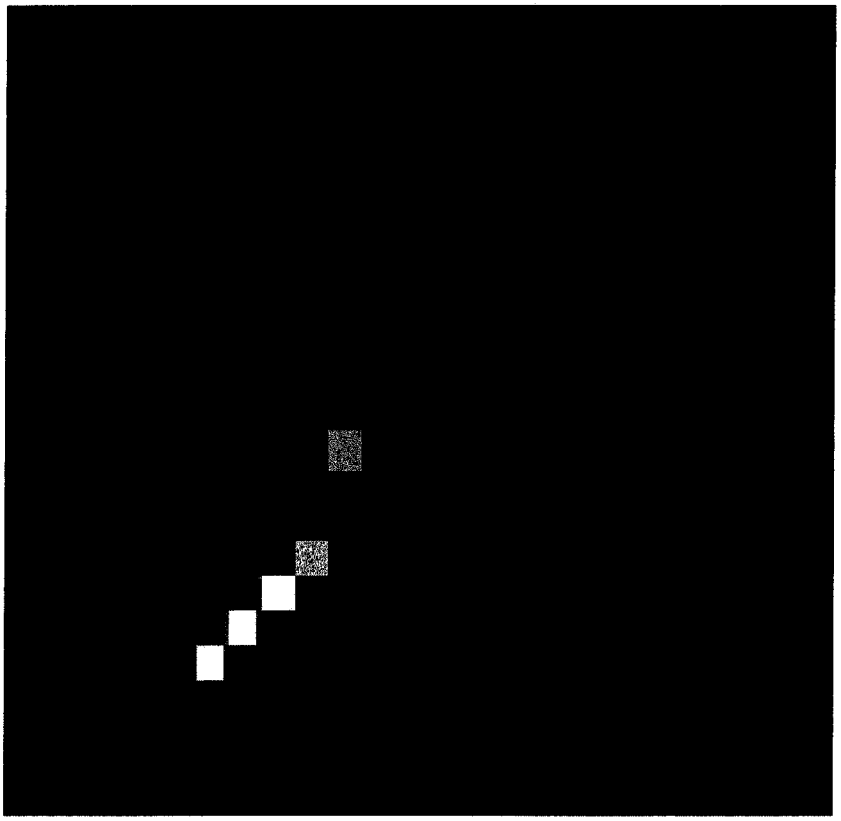
FIG. 8 illustrates the effect of the attention mechanism on the natural language sequence generated from a dialog act.

FIG. 8 shows an Attention heatmap for a particular sample. This attention matrix is obtained for the following example,

[D-ACT]: inform(name='noe 7s nest bed and breakfast'; address='1257 guerrero st')

[REFERENCE]: * the address is 1257 guerrero st for noe 7s nest bed and breakfast. #

[PREDICTED]: noe 7s nest bed and breakfast is located at 1257 guerrero st.

The dialog act is written along the columns of the matrix and corresponding prediction is written along the rows of the matrix. An $i^{th}$ row in the matrix represents the weights given over all the character embeddings of source dialog act for generating the $i^{th}$ character of the target utterance.

It can be observed that the model, while uttering the address, focuses its attention on the corresponding region of the dialog act. The attention is even more prominent in the case of digits. This indicates that the character-level model is able to "attend" or "focus" on the embeddings of specific parts of the dialog act which contain named entities.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
    building a target background model using words occurring in training data, the target background model being adaptable to accept subsequences of an input semantic representation, the training data includes training pairs, each training pair including a semantic representation and a corresponding reference sequence in a natural language;
    receiving human-generated utterances in the form of speech or text;
    predicting a current dialog state of a natural language dialog between a virtual agent and a user, based on the utterances;
    generating a semantic representation of a next utterance, based on the current dialog state, the semantic representation including a sequence of characters; and
    generating a target sequence in a natural language from the semantic representation, comprising:
        after generating the semantic representation, adapting the target background model to form an adapted background model, which accepts all subsequences of the semantic representation;
        representing the semantic representation as a sequence of character embeddings;
        with an encoder, encoding the character embeddings to generate a set of character representations; and
        with a decoder, generating a target sequence of characters, based on the set of character representations, wherein at a plurality of time steps, a next character in the target sequence is a function of a previously generated character of the target sequence and the adapted background model; and
        outputting the target sequence.

2. The method of claim 1, wherein at least one of the representing of the semantic representation, adapting of the background model, encoding the character embeddings, and generating a target sequence of characters is performed with a processor.

3. The method of claim 1, wherein the background model comprises a finite state automaton.

4. The method of claim 3 wherein, in the finite state automaton, transitions between states are associated with respective probabilities, and wherein transitions between the target background model and subsequences of the semantic representation are associated with a respective probability which is lower than a probability assigned to a transition between two characters in the semantic representation.

5. The method of claim 1, wherein in generating the target sequence of characters, a next character in the target sequence is also a function of an attention model which biases selection of a next character representation to be input to the decoder towards character representations for a region in the sematic representation.

6. The method of claim 1, wherein the decoder includes a recurrent neural network.

7. The method of claim 6, wherein cells of the recurrent neural network are selected from Long Short-Term Memory (LSTM) and Gated Recurrent Unit (GRU) cells, each of which, except the first, taking as input a hidden state output by the previous cell in the recurrent neural network and a previously-generated embedding of a character in the target sequence and compute a conditional probability distribution for an embedding of a next character in the target sequence.

8. The method of claim 1, wherein the encoder is a bi-directional recurrent neural network.

9. The method of claim 8, wherein the character representations are each a concatenation of hidden states of cells of forward and backward recurrent neural networks, which cells receive as input the respective character embedding.

10. The method of claim 1, further comprising learning a hierarchical model which includes the encoder and decoder using a training set of semantic representations and respective reference sequences.

11. The method of claim 10, further comprising generating the target background model from words present in the training set.

12. The method of claim 1, wherein the characters in the semantic representation and target sequence are drawn from a finite alphabet.

13. The method of claim 1, wherein the finite alphabet consists of no more than 400 characters.

14. A computer program product comprising a non-transitory recording medium storing instructions, which when executed on a computer, causes the computer to perform the method of claim 1.

15. A system comprising memory storing instructions for performing the method of claim 1 and a processor, in communication with the memory, which executes the instructions.

16. A method comprising:
training a hierarchical model with training data, the training data including training pairs, each training pair including a semantic representation and a corresponding reference sequence in a natural language, to minimize, over the training data, an error between a realization output by the model and the reference sequence assigned to the training sample, the hierarchical model including an encoder, a decoder, and a target background model, built from a vocabulary of words;
receiving a human-generated utterance in a natural language;
predicting a current dialog state based on the utterance;
generating a semantic representation of a next utterance, based on the current dialog state, the semantic representation including a sequence of characters; and
generating a target sequence in a natural language from the semantic representation, comprising:
adapting the target background model to form an adapted background model, which accepts subsequences of the sequence of characters in the semantic representation;
representing the semantic representation as a sequence of character embeddings;
with the encoder, encoding the character embeddings to generate a set of character representations; and
with the decoder, generating a target sequence of characters, based on the set of character representations, wherein at a plurality of time steps, a next character in the target sequence is a function of a previously generated character of the target sequence and the adapted background model; and
outputting the target sequence,
wherein the decoder includes an adaptor part and a background part, the adaptor part defining a first conditional probability distribution for sampling a next character in the target sequence, given the already generated characters, the background part defining a second conditional probability distribution for sampling the next character in the target sequence, given the already generated characters, which is based on the adapted background model, an overall conditional probability distribution for sampling the next character being a function of the first and second conditional probability distributions.

17. The method of claim 16, wherein the overall conditional probability distribution is a function of a product of the first and second conditional probability distributions.

18. A dialog system comprising:
a dialog state tracker which predicts a current dialog state based on received human-generated utterances in the form of speech or text;
a dialog manager which generates a semantic representation of a next utterance, based on the current dialog state, the semantic representation including a sequence of characters; and
a system for generation of a target sequence from the semantic representation comprising:
a hierarchical character sequence-to-character sequence model;
a character embedding component which represents the semantic representation as a sequence of character embeddings;
a natural language generation component which inputs the sequence of character embeddings into the hierarchical model;
an output component which outputs the target sequence;
a learning component for training the hierarchical model with training data, the training data including training pairs, each training pair including a semantic representation and a corresponding reference sequence in a natural language, to minimize, over the training data, an error between a realization output by the model and the reference sequence assigned to the training sample; and
a processor which implements the learning component, dialog state tracker, dialog manager, character embedding component, natural language generation component, and output component;
the hierarchical model comprising:
a target background model, built from a vocabulary of words, which is adapted by copying subsequences of the generated semantic representation, to form an adapted background model, which accepts subsequences of the input semantic representation;
an encoder, which encodes the character embeddings to generate a set of character representations; and
a decoder, which generates a target sequence of characters, based on the set of character representations,
wherein at a plurality of time steps, a next character in the target sequence is a function of a previously generated character of the target sequence, and the adapted background model.

19. A method for generating a system for generation of a target sequence of characters from an input semantic representation, the method comprising:
providing training data which includes training pairs, each training pair including a semantic representation and a corresponding reference sequence in a natural language;
building a target background model using words occurring in the training data, the target background model being adaptable to accept subsequences of an input semantic representation;
incorporating the target background model into a hierarchical model which includes an encoder and a decoder, the encoder and decoder each operating at the character level, such that the background model, when adapted to accept subsequences of the input semantic representation, biases the decoder towards outputting a target character sequence comprising at least one of:
words occurring in the training data, and
subsequences of the input semantic representation; and
training the hierarchical model on the training pairs to output a target sequence from an input semantic representation,
wherein the decoder includes an adaptor part and a background part, the adaptor part defining a first conditional probability distribution for sampling a next character in the target sequence, given the already generated characters, the background part defining a second conditional probability distribution for sampling the next character in the target sequence, given the already generated characters, which is based on the adapted background model, an overall conditional probability distribution for sampling the next character being a function of the first and second conditional probability distributions, and wherein at least one of the building of the target background model, incorporating the target background model, and training the hierarchical model is performed with a processor.

20. The method of claim 19, wherein the input semantic representation is a dialog act generated by an automated dialog system.

* * * * *